United States Patent [19]
Shioya

[11] 3,740,808
[45] June 26, 1973

[54] CUTTER, PARTICULARLY FOR GEAR HOBBING

[75] Inventor: Kazuma Shioya, Yao-shi, Osaka-fu, Japan

[73] Assignee: Dijet Industrial Company Limited, Osaka, Japan

[22] Filed: Dec. 16, 1971

[21] Appl. No.: 208,823

[30] Foreign Application Priority Data
Dec. 16, 1970 Japan.............................. 45/113348
Dec. 16, 1970 Japan.............................. 45/126976

[52] U.S. Cl............................ 29/105 R, 29/103 B
[51] Int. Cl............................................. B26d 1/12
[58] Field of Search ...................... 29/105 R, 103 B

[56] References Cited
UNITED STATES PATENTS
3,571,875  3/1971  Grandi .............................. 29/105 R
3,303,554  2/1967  Bateman et al. .................. 29/103 B
2,693,020  11/1954  Pelphrey ........................... 29/105 R Primary Examiner—Leonidas Vlachos
Attorney—Roberts B. Larson, William R. Hinds et al.

[57] ABSTRACT

The present invention relates to a cutter for gear cutting work, particularly a cutter capable of gear cutting work of high precision, and having throw-away type insert cutter tips which can be replaced easily.

4 Claims, 14 Drawing Figures

CUTTER, PARTICULARLY FOR GEAR HOBBING

BACKGROUND OF THE INVENTION

Hobs for gear cutting work are generally of complicated form, having numerous cutting edges on their periphery.

Conventional hobs having numerous cutting edges formed directly on the periphery of the hob body are being used widely. However, these hobs are uneconomical since it is necessary to replace the entire hob when its cutting edges are damaged or worn out.

Further, being mostly constructed from high-speed steel, these solid hobs are poor in durability and remarkable in abraison after use. Consequently, the drilled flutes of hob cutting edges must be ground frequently, and the grinding thereof requires skill and a great deal of time as well since it must be done very accurately. Moreover, these hobs made from high-speed steel are limited in their cutting speed in gear cutting work, necessitating the adoption of an extensive feed in order to increase efficiency. Consequently, the gear shape of the works to be cut departs substantially from the genuine involute curve, with the result of crudely finished surfaces. Therefore, in order to make up for such defects as above, it is necessary to do finishing work by gear grinding and shaving, with accurate re-grinding additionally required, all of which are very much troublesome.

On the other hand, a built-up hob is being used as an improved type over the conventional hobs, in which the hob body is equipped with cutter blades formed separately therefrom, aiming at an economical effect through possible replacement of said cutter blades alone. However, as these blades are in the form of a body incorporating numerous cutting edges formed in a lateral series, the blades themselves become pretty large in size and very complicated in shape, making it very difficult to regrind them when they are worn out, as in the case of a hob of integrated type.

Furthermore, it is impossible in fact to continue to use these built-up hobs only by replacing their cutter blades because their principal bodies will also be found fairly damaged when the cutter blades become useless after repeated re-grinding thereof.

It has been attempted to increase gear cutting efficiency by means of sintering of the hob material, but because of the difficulty of re-grinding, not to mention the difficulty of relieving grinding for precise tooth form due to the difficulty of grinding cemented carbides, hobs made of cemented barbides have hitherto been not in general use except for micron hobs.

It is, therefore, an object of the present invention to eliminate completely the aforesaid defects of the conventional hobs and provide a cutter which can be used in a very economical way through replacement of its insert tips alone, which are formed separately from and fitted to the hob body.

Another object of this invention is to provide such insert tips of suitable form for cemented carbides and capable of being used repeatedly by reversing them inside-out and topside down, increasing thereby the number of times of their use as well as their utility, worthy of the cost of expensive materials such as cemented carbides.

A further object of this invention is to provide a cutter capable of carrying out the forming, fitting and replacement of its insert tips very easily and quickly.

A still further object of this invention is to provide a cutter in which the cutter body has on its periphery a plurality of tip locators positioned at fixed intervals in a peripheral direction so as to be fixed simultaneously by means of a pair of tightening devices allowing each locator to support a number of tips with ease and accuracy, thereby making it possible to do gear cutting work of high precision without causing any crookedness in the tooth forms to be cut.

Yet another object of this invention is to provide a cutter in which, with the tops positioned in parallel in an axial direction, a plurality of tips can be tightened simultaneously and securely by means of a wedge and a clamping bolt, causing the tip fixing parts not to get loose and the tip supporting parts to be damaged as little as possible.

The objects as abovementioned can be attained by the improvement of the present invention, and embodiments thereof will be made clearer by the following detailed disclosure in conjunction with the drawings attached hereto.

According to the present invention, the cutter is so constructed that the peripheral surface of its cutter body has a number of insert tips so fixed thereon as to be detachable for easy replacement by means of a plurality of locators, wedges and clamping bolts, said insert tips being of throw-away type and capable of being reversed for use in different orientations, and also capable of being fixed securely in correct positions respectively.

BRIEF DESCRIPTION OF THE DRAWINGS

Hereunder is given a brief description of the drawings showing a typical embodiment as well as an improved embodiment of the present invention.

DESCRIPTION OF THE PREFERRED EMBODIMENTS

Figure 1:
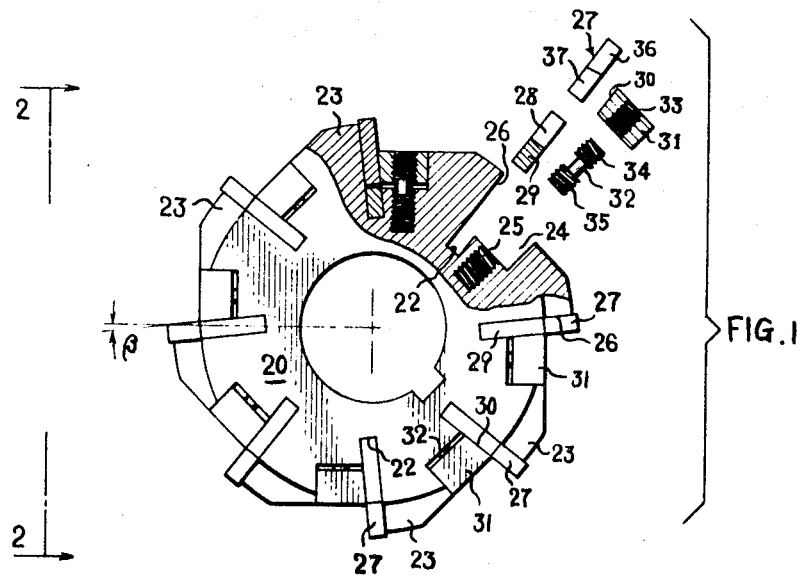
FIG. 1 is a side view of a typical hob body assembly according to the present invention, partly in section and exploded.
Figure 2:
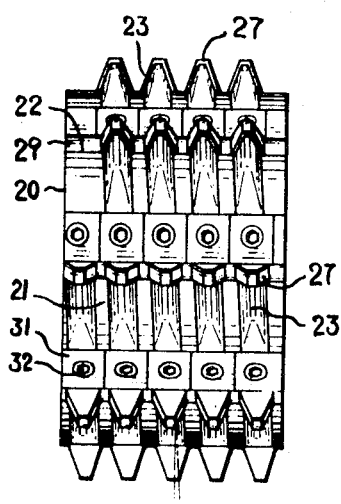
FIG. 2 is a front view of the hob body assembly taken substantially on the line 2 — 2 of FIG. 1.

Now, referring to FIG. 1 and FIG. 2 illustrating a typical embodiment of the present invention, the cutter body 20 has spiral flutes 21 on its periphery and a plurality of plain flutes 22 positioned at fixed peripheral intervals and parallel with the body axis, a plurality of tip supporting parts 23 being formed in the manner of hob teeth between said spiral flutes 21 behind each plain flute 22, and grooved wedge fitting holes 24 and tapped holes 25 also being formed ahead of each plain flute 22.

Similar to ordinary hob teeth, each of said tip supporting parts 23 is arranged as a spiral having the lead angle ($\alpha$) on the pitch circle of the teeth with respect to each plain flute 22, and also is so formed as to produce a negative rake angle $\beta$ of the tip seats 26 formed in front of them, the size thereof being smaller than the insert tips 27.

Each of the insert tips 27 is fixed to the cutter body 20 so as to be detachable by means of a plurality of locators 29, a plurality of wedges 31 and clamping screws 32, said locators 29 having plural tip supporting holes 28 and said wedges 31 having slopes 30 for tightening the tips; each locator 29 being so fitted in the plain flutes 22 as to place each tip supporting hole 28 in the correct position opposite to the root of tooth of each tip supporting part 23 of the cutter body 20; each insert tip 27 leaned on the tip seat 26 with its lower part engaged with the tip supporting hole 28 being clamped by means of clamping bolts 32 with the wedge 31 engaged with the wedge fitting hole 24. Thus, it is intended to obtain an economic effect through repeated use of the cutter body 20 which is made possible by mere replacement of the insert tips 27 alone.

Further, these insert tips 27 are supported in an inclined state on each tip seat 26 which has a negative rake angle $\beta$ with an adequate tip clearance given thereto. Said rake angle $\beta$ is more or less variable in proportion to the diameter of the cutter body 20, the thickness of the insert tip 27 and the cutting work conditions but is preferably formed at about $-6°$ in general.

Furthermore, as shown in FIG. 1, in said clamping bolts 32, both left-handed screws and right-handed screws are used, for example, left-handed screw 34 matching to the left-handed tapped hole 33 provided in the wedge 31 and right-handed screw 35 matching to the right-handed tapped hole 25 provided in the cutter body 20. However, differential screws may also be employed therein.

Next, describing the insert tip 27 in detail: the upper part of each tip 27 is formed as the tip body 36 and the lower part as its setting side 37 (FIG. 1). For a basic form thereof, it is contemplated to form the tip body 36 in the shape of a flat block having a profile of theoretical tooth form corresponding to said rake angle $\beta$ $-6°$ and to form the setting side 37 into any form as desired.

Now, as these insert tips are usually made from materials of high anti-abrasive quality such as cemented carbides, ceramics and thermit, it is desired to increase their utility worthy of the cost of the materials as much as possible.

Figures 3, 4:
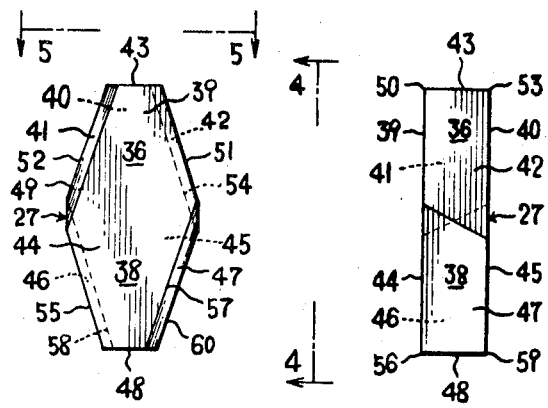
FIG. 3 is an enlarged front elevation of the insert tip of throw-away type.
FIG. 4 is an enlarged side elevation of the insert tip of throw-away type taken substantially on the line 4 — 4 of FIG. 3.
Figure 5:
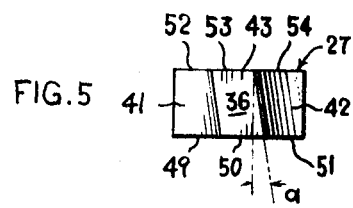
FIG. 5 is an enlarged upper plan of the throw-away type insert tip taken substantially on the line 5 — 5 of FIG. 3.

Thereupon, these tips take a form of throw-away type as shown in FIGS. 3 – 5.

Referring to FIGS. 3 – 5, the lower part of each tip formed as setting side 37 is now turned into a sub-tip 38 by forming it like the tip body 36 formed at the upper part of the tip, each sub-tip 38 taking a posture reversed by 180° upside down with respect to the upright tip body 36, and thus a throw-away tip being formed by incorporating the tip body 36 and sub-tip 38 into a body at the root of tooth thereof.

In other words, the tip body 36 has two parallel flat faces 39 40, two sides 41 42 and a top plane 43, said flat faces 39 40 having a profile of theoretical tooth form corresponding to said rake angle $\beta$ $-6°$. The sub-tip 38 has also flat faces 44 45, two sides 46 47 and a top plane 48.

Further, said flat faces 39 and 44 as well as 40 and 45, respectively, form two parallel polygonal faces, the top plane 43 of the tip body 36 and the top plane 48 of the sub-tip 38 being formed parallel with each other and vertical to said flat faces 39 40 and 44 45.

Furthermore, said insert tip 27 is fitted in parallel to the hob axis, and both sides 41 42 of the tip body 36 are made oblique to the flat faces 39 40 by said lead angle $\alpha$, while both sides 46 47 of the sub-tip 38 are made oblique in a reversed state and in the opposite direction to said sides 41 42 by a negative lead angle $-\alpha$.

Thus, it will be seen clearly that at each edge line of both the inside and outside of the tip 27, cutting edges are formed in the tip body 36 such as 49 50 51 at the outside and 52 53 54 at the inside, and similarly cutting edges 55 56 57 and 58 59 60 respectively in each side of the sub-tip 38.

When cutting work is done by tip body 36, sub-tip 38 serves as a setting side, while when cutting is done by sub-tip 38 by reversing it, tip body 36 acts as a setting side. Thus, both the tip body 36 and sub-tip 38 are capable of having a combined function of cutting and setting. Now it can be understood that it is possible to obtain thereby effective throw-away type tips each of which can be used four times in total by reversing itself inside out and upside down.

In the embodiment of the invention illustrated in FIGS. 3 – 5, both of the tip body 36 and sub-tip 38 are formed into a body so as to have the dedendum line in common. However, both of them may be incorporated with each other via a central flat portion of an adequate length (not shown).

Figure 6:
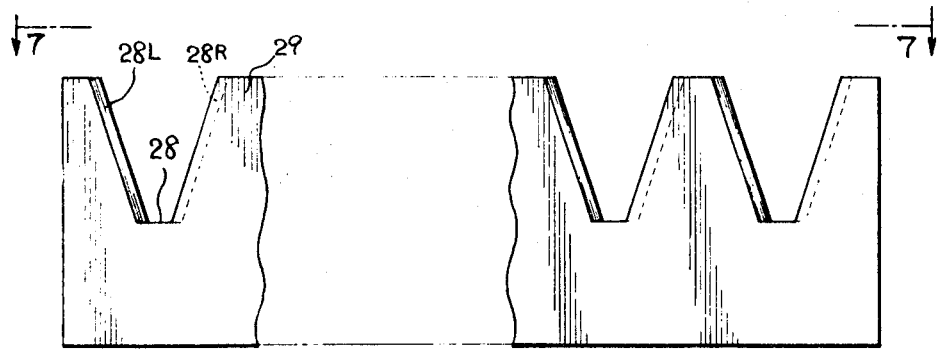
FIG. 6 is an enlarged front elevation of the locator partly broken away.
Figure 7:
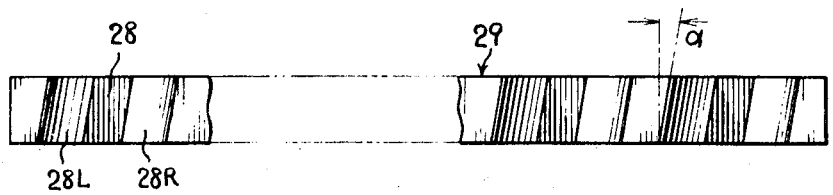
FIG. 7 is a plan of the locator taken substantially on the line 7 — 7 of FIG. 6.

Next, the locator 29 shown in FIG. 6 and FIG. 7 is for positioning each plurality of tips 27 correctly in the axial direction and is formed in thickness approximately equal with said tips 27, and it has a plurality of tip supporting holes 28 provided in its upper side portion at the same pitch as the axial pitch of the tip supporting parts 23 of said cutter body 20.

Each of these tip supporting holes 28 is formed so as to correspond to the shape of the lower portion of the tip 27.

Consequently, when the lower portion of the tip 27 is formed as a setting side 37 of a different shape from that of the upper portion of the tip body 36, each tip 27 is to be positioned so as to be reversible inside out by forming said tip supporting holes 28 to correspond to said setting side 37 in their shapes engaging the latter 37 with the former 28. However, when said setting side 37 is formed as a sub-tip 38 like the tip body 36 (see FIGS. 3–5), each tip supporting hole 28 is to be formed to correspond to these sub-tips 38 and the tip body 36 in its shape.

Thereby, it becomes possible to support the tip 27 to be reversible upside down and inside out by alternative engagement of each tip supporting hole 28 and said sub-tip 38 with each other. Both sides 28L 28R are to be inclined at a lead angle −α respectively like sides 46 47 of the sub-tip 38 in upright position.

Further, each locator 29 is arranged circumferentially at fixed intervals through engagement with a plain flute 22 of the cutter body 20, and the tip supporting holes 28 of each circumferentially adjacent locator are arranged along a spiral direction with a lag of [ 1/number of plain flute 22] × [pitch of tip supporting part 23], these being formed to be capable of taking a correct position at the root of tooth of each tip supporting part 23.

Now, as shown in FIG. 1 and FIG. 2, each locator 29 is fitted to each plain flute 22 so as to make each tip supporting hole 28 correspond correctly to each tip supporting part 23, and each tip 27, the lower portion of which engages with respective tip supporting hole 28, is so fixed as to be detachable freely by means of wedge 31 and clamping screw 32 so that the tip 27 can be fixed securely in a bit projected position from the tip supporting part 23.

Figures 8, 9:
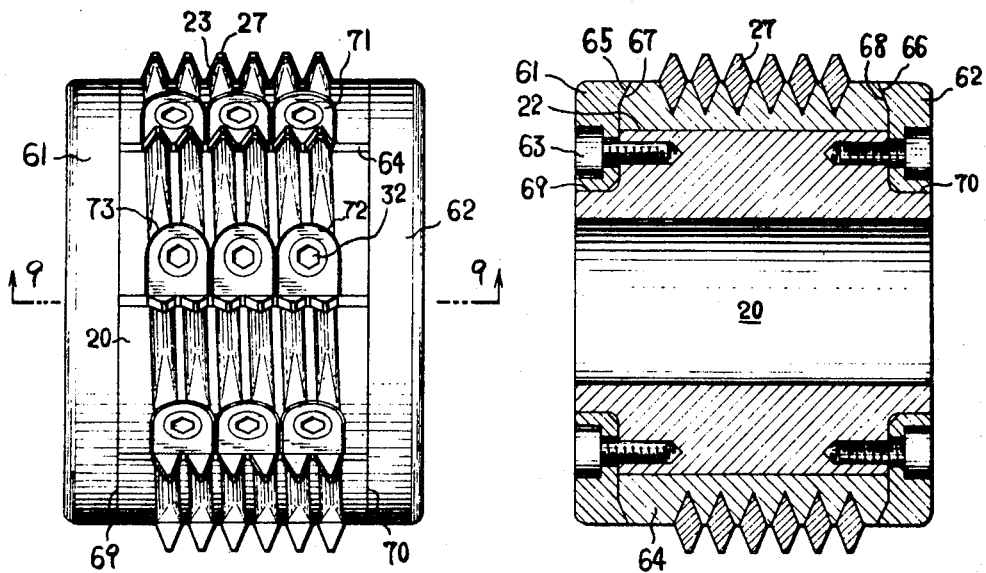
FIG. 8 is a front elevation showing an improved embodiment of hob body assembly according to this invention.
FIG. 9 is a sectional view taken substantially on the line 9 — 9 of FIG. 8.
Figure 10:
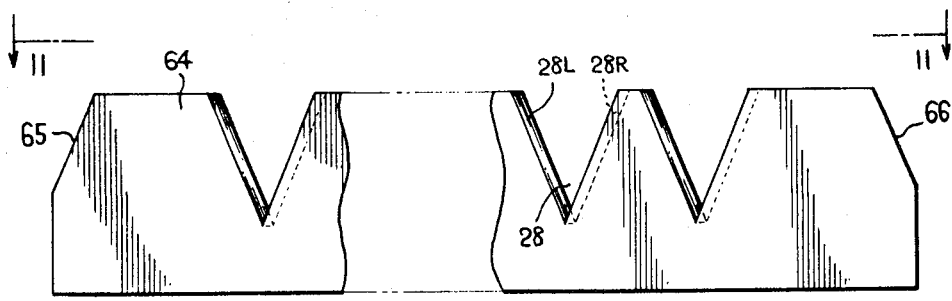
FIG. 10 is an enlarged front elevation partly broken away of an improved type locator to be used for the improved type hob body assembly shown in FIG. 8.
Figure 11:
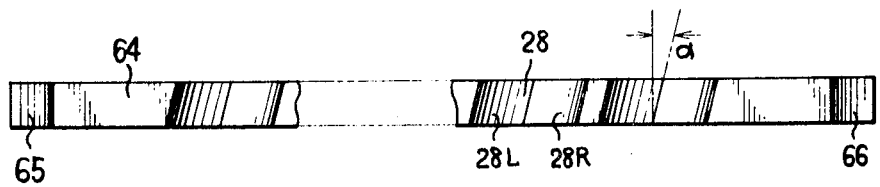
FIG. 11 is a plan of the locator taken substantially on the line 11 — 11 of FIG. 10.
Figure 14:
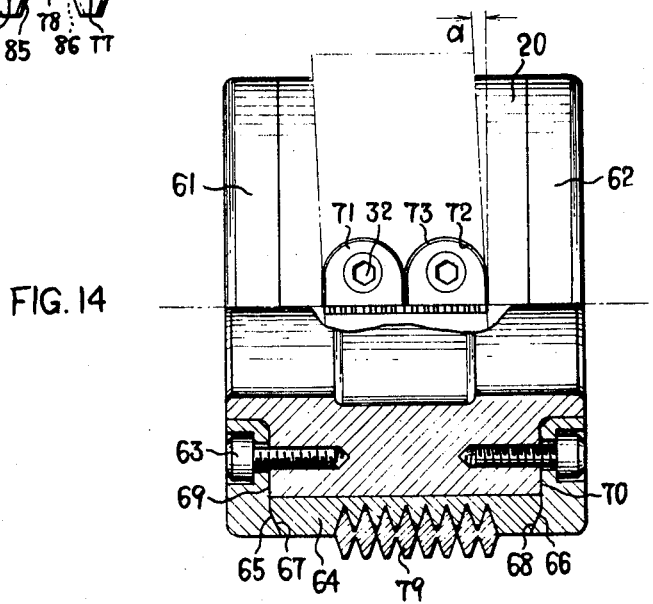
FIG. 14 is a front view with the principal part partly broken and omitted, of the hob body assembly equipped with the improved type insert tip illustrated in FIG. 12.

In the typical embodiment of the fixing method for said locators 29 shown in FIG. 1 and FIG. 2, each of these locators 29 is fixed with use of a binding agent so as to have it engaged with each plain flute 22 of the cutter body 20, but these locators 29 can be fixed mechanically by means of a pair of clamping rings 61 62 and a plurality of clamping bolts 63 as shown in FIGS. 8, 9 and 14.

The improved type locator 64 shown in FIGS. 9 − 11 has tapers 65 66 formed at both ends of its upper side portion, and a plurality of said locators 64 are fixed at a time by pressing the tapers 67 68 formed inside the peripheral portion of the clamping rings 61 62 against said tapers 65 66.

In this case, circular concave portions 69 70 are formed at both ends of the cutter body 20 into which the clamping rings 61 62 are inserted respectively, clamping being done in this state by means of a plurality of clamping bolts 63.

The wedges 31 for tightening said tips 27 engage with the wedge fitting holes 24 provided on the cutter body 20, and the tips are tightened by means of clamping screws 32 in such a state that the tips are pressed against the tip seats 26 of the cutter body 20 by the tip clamping slopes 30 formed in the backsides thereof. In the embodiment illustrated in FIG. 1 and FIG. 2, each tip 27 is fixed respectively by means of a wedge 31, but it is possible, when desired, to fix two tips 27 at a time by forming the wedge 31 to have a large width as shown in FIG. 8.

The improved type wedge 71 illustrated in FIG. 8 is formed to have a width twofold of the tooth width. With use of the improved wedge 71, it becomes possible to fix two tips 27 in a correct position at a time by having the rear inside 72 of the wedge fitting hole 24 of the cutter body 20 and the backside 73 corresponding thereto of the wedge 71 respectively formed in curved surfaces and through self-alignment of the guide of said arcs 72 73.

Thereby, in cutting work of small-pitched teeth with use of small pitches, said simultaneous fixing of two tips 27 by a single wedge 71 makes it possible to increase working efficiency through a reduced number of items to be used and simplified fitting thereof, and at the same time, it becomes possible to do cutting work of high precision through accurate function of the wedge 71 on each tip 27 which will not be caused to be crooked in its position preventing works from being cut in crooked tooth form with a result of cutting work of high precision carried out satisfactorily.

Further, with each tip 27 supported individually by its supporting part 23, fitting thereof often becomes very troublesome, particularly fitting and removal of the tips becoming more difficult in case of small axial pitch as the tips themselves must be reduced accordingly.

Figure 12:
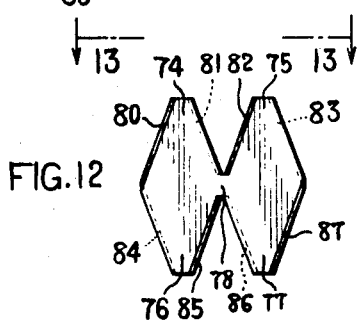
FIG. 12 is a front elevation showing a typical embodiment of the improved type throw-away insert tip according to the present invention.
Figure 13:
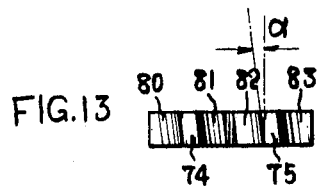
FIG. 13 is a plan taken on the line 13 — 13 of FIG. 12.

Now, according to an improved design of the present invention, so called compound tips 79 are provided by having a plurality of unitips 74 75 76 77 corresponding to each tip supporting part 23 and also incorporated into a body connecting them with each other via connecting parts 78 (see FIGS. 12–14).

In FIGS. 12–14, each of the unitips 74 75 76 77 is formed to have a flat shape of a profile of theoretical tooth form with a negative rake angle β like the tip body 36 shown in FIG. 3 − 5. The lower unitips 76 and 77 are turned over by 180° and incorporated into the root of tooth of the upright unitips 74 and 75, so called compound tip 79 thus being formed by connecting these unitips with each other by means of the connecting parts 78 in the same pitch as the axial pitch of the tip supporting parts 23 of the cutter body 20.

In such a case, while the sides 80 81 and 82 83 of the unitips 74 75 are inclined by the lead angle +α, the sides 84 85 and 86 87 of the reversed unitips 76 77 will be inclined by the lead angle −α. Thereby, it is possible to obtain the compound tip 79 capable of being reversible upside down and inside out.

Even in case of cutting small-pitched teeth, by using said compound tips 79, it becomes possible to increase working efficiency through mass processing of the tips made easy and simplified and quick operation of fitting and detaching of the tips.

Further, when fixing said compound tips 79, it is possible if desired, like the fixing of the tips 27 shown in FIG. 8, to fix two compound tips 79 (equivalent to four times as many unitips) at a time by means of the wedges 71 formed in a large width.

From the foregoing, it will be seen clearly that the cutter according to the present invention attains a highly economical effect through repeated use of the cutter body made possible by mere replacement of its tip or tips alone, and the invention also displays fully its efficiency, compensating sufficiently its cost of construction even when its tips are made from expensive materials such as cemented carbides since these tips can be used an increased number of times due to the fact that if one of its cutting edges is worn out or damaged, a new cutting edge will be put in service readily merely by changing the fitting posture of the very tip.

What is claimed is:

1. A rotary gear cutter having a cutting body which comprises a plurality of plain flutes arranged on its periphery parallel to its axis at fixed intervals in peripheral direction; a plurality of tip supporting parts of hob tooth configuration arranged in the axial direction at fixed axial intervals along but behind each said plain flute; tip locators fitted to each said plain flute and having tip supporting holes which correspond to each each supporting part; flat shaped tips each having gear cutting edges formed in an upper body part and having a lower setting part at the root of tooth to engage with one of said tip supporting holes; and wedges ad clamping screws for fixing said tips so as to be detachable freely.

2. A rotary gear cutter as claimed in claim 1 wherein the tip body part has two flat parallel surfaces, an upper end face normal to said flat surfaces and lateral sides inclined parallel with the hob tooth lead angle; the setting part arranged at the root of tooth of said tip body being formed as a sub-tip of the same shape as the tip body part; the tip body part and sub-tip being integrally joined but oppositely oriented such that either the tip body part or the sub-tip may assume the position of the other interchangeably; effective cutting edges being formed to be supported at a negative rake angle on all the sides of each said tip body and each said sub-tip, obtaining thereby throw-away type tips capable of being freely reversible upside down and inside out.

3. A rotary gear cutter as claimed in claim 2 wherein a plurality of said throw-away tips, each comprising an integrally joined tip body part and sub-tip, are connected laterally to provide a compound throw-away tip thereby.

4. A rotary gear cutter as claimed in claim 1 wherein each tip locator is formed of plate material, and has a number of tip supporting holes provided in the upper side portion thereof to engage with the lower portions of the tips at the root of tooth of the tip supporting parts positioned behind the corresponding plain flute into which said locator is inserted; each locator having tapered faces at its end portions; a locator fixing device for simultaneously fixing all the locators, said fixing device comprising a pair of clamping rings having tapers on their inside peripheries corresponding to the tapers of each locator inserted in a plain flute.

* * * * *